Patented Oct. 14, 1930

1,778,139

UNITED STATES PATENT OFFICE

ROBERT JOHN, OF NEW YORK, N. Y.

POSITIVE MOTION-PICTURE FILM

No Drawing.   Application filed April 27, 1922.  Serial No. 557,015.

My invention relates to a positive motion picture film and has for its object to produce a film capable of enlarged projection in which the images are formed of coloring matter applied by transfer.

At the present time, motion picture positives are made by a purely photographic process. The images are formed of reduced silver, it being the practice to employ a silver salt emulsion film to which the steps of exposure, development, washing, fixing, and drying are applied. Each positive print, in other words, is a separate and independent photograph of the negative and requires separate and independent photographic treatment in its production. Each positive, therefore, even though made from the same negative, varies in photographic effect from every other positive according to the variability of the skill of the operator, the fluctuation of the exposure light, the time of development, the temperature of the developer solutions, and the degree of exhaustion of the developer solutions. In addition to the high cost of production and the lack of uniformity due to the fact that each positive print is a separate photograph of the negative, the present day process has other disadvantages:

First, the range of colors in which the picture may be produced is limited to the colors which may be obtained by toning the silver grain or tinting the clear parts of the gelatin or celluloid.

Second, the metallic silver particles which are grouped to form the image are opaque, and often are piled up in the shadows to such an extent as to prevent the transmission of light, thereby causing loss of shadow detail when projected.

Third, the life of the film in projection is reduced materially by reason of the fact that the film is perforated before exposure and that the after treatment in alkaline and acid baths and the long washings necessary, weaken the unpolished edges exposed at the perforations and cause them to fray and tear long before the film otherwise is unfitted for projection.

Fourth, the metallic silver particles embedded in the gelatin film, when exposed to the projection light, absorb heat to such an extent as to ignite the adjacent celluloid much more readily than if no metallic particles were present.

Fifth, it is well known that as a result of the development of a photographic emulsion, there always is present in the finished result a certain amount of chemical fog in portions of the picture where the light has not acted. This fog, small though it may be, tends to veil the entire picture and increases materially the light required to project the picture the desired distance. In other words the highest lights of a developed motion picture film never are as brilliant as the plain celluloid base and this veiling or fogging interferes materially with the successful projection of pictures particularly where inadequate lighting facilities are at hand.

I find that the foregoing difficulties may be overcome without offsetting disadvantages, if, instead of the purely photographic method of reproduction being used, the following steps be substituted to produce the film:

First, I make a master positive film from the original negative, this positive being exposed to the original negative in such a way as to preserve the same relationship between its separate pictures and the perforations as that borne by the negative itself. This master positive must have the characteristic of being able either to absorb an aqueous solution of dye or to retain a film of greasy ink, the dye so absorbed, or the ink so retained, corresponding to the lights and shades obtained by exposure to the negative.

Second, having produced such a dye or ink carrying positive and having charged it with color, I transfer the color from the master positive to a support which becomes the final print itself, effecting such transfer in a manner to preserve the correspondence between the individual pictures and the perforations so that the finished print bears the relationship between each picture and its perforations as was borne by the original negative.

I find, when films are produced by this method, that it is relatively as simple to produce uniform prints as it is to maintain uniformity in the successive copies which are struck off a printing press. I find, also, that the cost of producing prints by this process averages for thirty prints, for example, only about one-tenth that of producing them by the purely photographic process, in spite of the fact that an extra master positive is required.

I find also the following advantages:

First, the range of colors in which the picture may be produced is practically infinite, being limited only by the colors of dyes and inks and mixtures of them which may be obtained. Since the color chosen represents merely the color with which the master positive is charged, there is little or no extra expense involved in producing pictures in various colors.

Second, the coloring matter used preferably is much more transparent than the metallic silver particles used in the photographic process, consequently there is in the projected picture much more shadow detail, which gives an increased impression of roundness or perspective when viewed in comparison with the silver film.

Third, it is not necessary to expose the perforations to solutions or baths or moisture of any kind, and the result is that I have found that film prepared by my process, gives at least three times the service in the projecting machine as that given by film on similar base made by the photographic process.

Fourth, there being no metallic particles embedded in the gelatin film made by my process, when exposed to the projection light, absorbs very little heat with the result that it ignites the celluloid base much less quickly in the projection machine than film on similar base made by the photographic process.

Fifth, in film made by my process, the pictures being mechanically applied rather than chemically produced, it is possible to get high lights which are as clear as the support itself; or, conversely, I find that under given projection conditions, my film requires only two-thirds the amount of light that would be required to give equal brilliancy in the projection of a purely photographic film.

The invention is applicable to monochromatic, polychromatic, or natural color photography. The term "color" is intended to include black which sometimes technically is designated as an absence of color. The ultimate print may consist of a base of any suitable transparent material, as celluloid, if the projection is to be accomplished by transmitted light; or of any suitable opaque material, as paper, if the picture is to be projected by means of reflected light. The base may be employed either with a colloidal coating such as gelatin, or without such coating. The base preferably is perforated, by which I mean any hole, slot, notch, or nick cut into the film, in order to preserve registration of pictures, and to obviate the disadvantages caused by stretching or shrinkage of the film.

As to the color carrying, master positive, I am aware that the preparation of a photographic positive having dye carrying or ink retaining qualities, corresponding to the lights and shades of the object photographed, is not new. Such a dye carrying positive may be produced by the bichromate gelatin process as disclosed in patent to Shepherd and Bartlett, No. 728,310, granted May 19, 1903, or it may be produced by the process described in my own Patent, No. 1,374,853, granted April 12, 1921. Such an ink printing positive may be prepared as disclosed in Cassell's Cyclopædia of Photography, Cassell and Company, New York, 1912, on page 124, under the title "Collotype" or as described in my Patent No. 1,374,853 above referred to.

While so far I have found it impossible to produce motion picture film from master positives prepared by the Shepherd and Bartlett process, or by the collotype process; and while I do find it possible to produce motion picture film from master positives made either for dye carrying or ink retention by my own process last referred to, yet the preparation of the printing or master positive is merely a step in my said motion picture process, and my present invention relating thereto resides in the finished motion picture print and in the process necessary to produce said finished print, irrespective of how the color carrying, master positive is attained.

I am well aware that the use of a dye carrying positive for producing motion pictures has been suggested. I do not recall that the use of an ink retaining positive ever has been proposed. But whether it has or not, I believe that I am the first actually able to utilize such color carriers in the production of motion picture film capable of enlarged projection. One novel step which makes the accomplishment of my object possible lies in the fact that I provide a method for maintaining the original relationship between perforations and pictures in the finished transfer print. Such relationship is essential to every motion picture, else the pictures in projection either would result in a blurred image, or in one which continually would walk off the screen. This, of course, is as essential in film made by the purely photographic method as it is in films prepared by my process.

In the photographic method, however, the attainment of this picture-to-perforation relationship presents no difficulties by reason of the fact that although the negative film and the unexposed positive may have stretched or shrunk and although their perforations may never at any time have coincided, yet the films are exposed in a dry state and it is possible therefore at each perforation or at each picture, to effect or permit a slight slippage, one way or the other so that the registry is maintained.

In the production of dye transfer pictures, however, any such slippage would cause a blur and if for no other reason, such pictures never have been produced previous to my invention.

I will now proceed with a description of my invention and will explain first, for purposes of illustration, the methods I employ in the production of a dye transfer picture, these methods being somewhat different from the methods employed in the production of an ink transfer picture.

As has been stated previously, I have found it impossible to make dye printing motion picture positives by other methods than those disclosed in my Patent No. 1,374,853 referred to above. The reason for this is that in all other dye printing positives with which I am familiar, the character of the dye carrying material is such that relatively long immersion in the dye must be given and consequently relatively long contact with the print film must be made. In any motion picture process, the time of dyeing and the time of transference must be very short, not only because of the cumbersome apparatus which would be required to produce pictures hundreds of feet in length, and not only because speed of production is an important element in motion picture work, but rather because if the transfer is not effected quickly, the result is a slightly blurred image due to diffusion of the dye, which although it might be satisfactory on an ordinary photographic print, would not produce a satisfactory picture when enlarged many diameters for projection as motion pictures must be. It must be realized also that motion pictures of the type which are projected by transmitted light, require a very much greater density than the pictures printed on an opaque surface such as paper and viewed by reflected light. I have found that in all known dye transfer processes, that the least time possible in which to effect the transfer of an image of sufficient density for transmitted light projection to be upward of twenty minutes. I also have found that in any dye transfer, motion picture process, that it is not advisable to extend the period of transference above two minutes, otherwise blurring begins to take place. By using the process of making a dye carrying positive described in my Patent No. 1,374,853, I find that it is entirely practical to effect sufficient transfer of the dye in less than one minute's time, so I will describe one embodiment in which I make a desirable dye carrying positive for this purpose under that patent.

I first expose a suitable silver salt emulsion film through its transparent support, to the negative to be reproduced, by any known means, whereby the picture-to-perforation relationship is maintained.

I next subject the exposed film to a developing bath, a sample formula for which is as follows:

| | |
|---|---|
| Water | 64 ounces |
| Pyrogallic acid | 270 grains |
| Sodium sulphite | 270 grains |
| Sodium carbonate | 2000 grains |

In the above sample formula, the hardening or tanning agent is pyrogallic acid and the controlling or limiting agent is sodium sulphite, which may be varied in amount selectively within limits to obtain the required results, and the accelerating agent is sodium carbonate which may also be varied in amount according to the result desired.

Having subjected my exposed film to the above developing solution for a period of two to four minutes at a temperature of from 60 to 70 degrees Fahrenheit, I next bring my exposed and developed film into water at a temperature of from 90 degrees to 110 degrees Fahrenheit, with the result that all of the unhardened gelatin dissolves away leaving on the base an image consisting of great numbers of extremely minute, individual protuberances which are distributed and grouped irregularly so as to represent a record of the photographic lights and shades of the negative to be reproduced.

My next step, having dried my dye carrying positive, is to immerse it in a suitable dye of any color. Such a dye, if a blue-black picture is desired, could be an aqueous solution of naphthol blue-black of a strength of 30 grains of the dye to each ounce of water, acidified by means of the addition of one minim of glacial acetic acid to each ounce of solution.

I find that an immersion of 15 to 30 seconds in such dye solution is sufficient to give the maximum color to the carrier.

Having removed the excess dye from the carrier, my next step is to bring it in contact, either wet or dry, with a film, either of celluloid, or paper, as the case may be, such film preferably having been coated with a 6% solution of gelatin in water containing a hardening agent such as formalin, to render it insoluble, said coating having been applied in such a manner as to produce a film approximately five one-thousandths of an inch in thickness, and before having been brought into contact with the dye carrier, having been moistened with water at a temperature of approximately 70 degrees for from 15 to 30 seconds.

I find, after from 30 to 60 seconds of contact between the dye carrier and the moistened print film, that the transference of the image has taken place and the two then are separated, the print film to be dried and the dye carrying positive dried and redyed if further prints are required.

In the step last referred to, namely, that of bringing the dye carrier and the print film into contact, I employ an unperforated print film, whereas the dye carrier, as has been explained, is perforated in such a way as to maintain the picture-to-perforation relationship borne by the original negative.

While the two are in contact, I effect a perforation of the print, using the perforations already in the dye carrying pattern as a guide. In other words, my dye carrying positive not only transfers the picture, but serves as a pattern for perforating the print so that the picture-to-perforation relationship is at all times maintained.

Going, now, to a description of one embodiment of my process wherein an ink retaining positive is employed, I also find that such positive made as described in my Patent No. 1,374,853, is the most advantageous. I have not, in fact, been able to produce satisfactory results in using a positive made by the collotype process, for the reason that in a bichromate gelatin printing plate, it is practically impossible to retain the lights and shades without going into intricate methods of moistening and inking which would make it impractical for use in motion picture reproduction. The essential difference between the collotype film and my preferred film above referred to, is that in the collotype film, the image consists of varying degrees of hardness representing the lights and shadows, the shadows being very hard and the light tones very soft, whereas in a printing plate made by my process and consisting of great numbers of extremely minute, individual, hardened particles representing the lights and shades, these particles are of substantially the same hardness, and the photographic effect is formed by the differences in their sizes and their groupings. The advantages of such a printing plate for my process will be realized by any one skilled in the art.

In preparing my ink retaining positive, I vary from the procedure outlined in connection with the dye carrying positives and preferably pursue the following steps:

I first expose a suitable silver salt emulsion film to the negative desired to be reproduced, employing any known means whereby the relationship between pictures-to-perforations is maintained. I effect this exposure on the face of the emulsion rather than through the support, but I need to reverse the picture from right to left either by means of exposing through a lens as in a copying camera, or by means of placing the support side of the negative, to the emulsion side of the positive.

I then subject the exposed film to the following developing baths:

Water _____ 64 ounces
Pyrogallic acid_____ 270 grains
Sodium sulphite_____ 70 grains
Sodium carbonate_____ 1000 grains I develop the film in the above solution from one to four minutes at a temperature of 60 to 70 degrees Fahrenheit and dissolve out the unaffected silver salts by immersion in a hypo solution such as Water _____ 32 ounces
Sodium thiosulphate_____ 8 ounces After fixing, the film is washed and dried, and if desired, may be further selectively hardened in a solution of Water _____ 64 ounces
Potassium bichromate_____ 1024 ounces
Sulphuric acid_____ 30 minims This solution tends to increase the hardness of the insoluble particles already formed by the developer; and after washing, the plate may then, if desired, be subjected to a general hardening bath such as a 5% solution of formalin in water or of the well known alum hardeners.

The two hardening operations last mentioned are not essential to the process, but are of assistance in meeting certain moistening and inking conditions met with in a process of this kind as will be recognized by any one skilled in the art.

Having dried my ink retaining positive, it now is ready to be moistened, and it will be found that after such moistening and having been rolled either with leather or composition rollers or both, the same being charged with a greasy ink, that the ink adheres to those portions of the film which were affected by exposure to light and the selective hardening which was brought about by my special development.

Having charged my film with color, I next bring it in contact with a suitable film, either celluloid or paper, either coated or uncoated, according to the result desired, after which contact I find that the image is transferred from the color carrying positive to the film which becomes the finished print.

As in the case of the dye pictures heretofore described, I effect perforations while the films are in contact; or I proceed by the following alternative method:

I bring my ink charged positive in contact with a perforated base in such a manner as to obtain at each point only a single line of contact; and I drive my two films by means of sprockets in such a manner that at each perforation, a slight readjustment takes place, so that while there is a continual slippage, the blurring is scarcely noticeable since, as it occurs at each perforation, it is extremely minute. I find it possible to use this method in connection with ink prints, but not with dye prints, for the reason that the transference of the ink may be effected almost instantaneously whereas the transference of the dye even with my preferred dye carrying positive takes several seconds.

Many modifications of my invention will be apparent to those skilled in the art without departing therefrom or from the scope of the claims, my invention not being limited to the particular embodiments chosen for the purpose of illustration, but consisting of a motion picture film produced by an ink or dye transfer process and capable of enlarged projection by the reason of the absence of objectionable blurring and the maintenance of the picture-to-perforation relationship.

By the term "practically useful enlarged projection", occurring in the claims, is meant a projection which is apparently an unbroken image at above 50 diameters enlargement.

By the term "minute points" occurring in the claims is meant points not larger than 1/400th part of an inch.

What I claim and desire to protect by Letters Patent is:

1. A motion picture transferee film of the dye transfer type having an image comprising minute color dots in great numbers and more sparsely grouped in the lights and more densely grouped in the shades and being grouped irregularly according to the lights and shades of the original object photographed, and representing a naturally photographic record thereof, said dots and grouping thereof being of such character as to present an apparently unbroken image when projected at above 50 diameters enlargement.

2. A motion picture transferee film of the transfer type having an image comprising minute color dots in great numbers and more sparsely grouped in the lights and more densely grouped in the shades and being grouped irregularly according to the lights and shades of the original object photographed and representing a naturally photographic record thereof, the grouping of the dots being such as to not entirely cover the film, said film presenting an apparently unbroken image when projected at above 50 diameters enlargement.

3. A motion picture transferee film of the dye transfer type having an image comprising minute color dots in great numbers and more sparsely grouped in the lights and more densely grouped in the shades and being grouped irregularly according to the lights and shades of the original object photographed, said dots comprising substantially the same quantity of imbibed dye per unit of surface for the primary color used, the image being unmodified by mechanical pattern and said film presenting an apparently unbroken image when projected at above 50 diameters enlargement.

4. A multi-color motion picture transferee film of the dye transfer type having an image comprising individual minute microscopic color dots, grouped irregularly and representing a naturally photographic record of lights and shades, said grouping corresponding to the lights and shades of the original object photographed, the image being unmodified by mechanical pattern and appearing as an apparently continuous unbroken image at above 50 diameters enlargement.

5. A multi-color motion picture transferee film of the dye transfer type having an image comprising minute microscopic color dots, sparsely grouped in the lights and more densely grouped in the shades and representing a naturally photographic record of lights and shades of the image, and being grouped irregularly according to the lights and shades of the original object photographed, the image being unmodified by mechanical pattern, said dots and grouping thereof being of such character as to present an apparently unbroken image when projected at above 50 diameters enlargement.

6. A multi-color motion picture transferee film of the dye transfer type having an image comprising individual minute microscopic color dots grouped irregularly and representing a naturally photographic record of lights and shades, the dots being grouped irregularly according to the lights and shades of the original object photographed, said dots containing substantially the same quantity of imbibed dye per unit of surface for the various colors used and being unmodified by mechanical pattern, said film presenting an apparently unbroken image when projected at above 50 diameters enlargement.

In testimony that I claim the foregoing, I have hereunto set my hand this 26th day of April, 1922.

ROBERT JOHN.